(12) United States Patent
Chalabi et al.

(10) Patent No.: US 11,044,357 B2
(45) Date of Patent: Jun. 22, 2021

(54) USER PERIPHERAL

(71) Applicant: MICROSOFT TECHNOLOGY LICENSING, LLC, Redmond, WA (US)

(72) Inventors: Malek Mohamad Nafez Chalabi, Seattle, WA (US); Gary T. McCoy, Oakland, CA (US); Eliana Miriam Feigelstock, Seattle, WA (US); Vikram Khandpur, Kirkland, WA (US); Dustin R. Brown, Kirkland, WA (US); Naveen Kachroo, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 16/521,538

(22) Filed: Jul. 24, 2019

(65) Prior Publication Data

US 2019/0394323 A1 Dec. 26, 2019

Related U.S. Application Data

(63) Continuation of application No. 15/402,847, filed on Jan. 10, 2017, now abandoned.

(Continued)

(51) Int. Cl.
*H04M 1/72409* (2021.01)
*H04M 1/253* (2006.01)
(Continued)

(52) U.S. Cl.
CPC ...... *H04M 1/72409* (2021.01); *H04B 1/3877* (2013.01); *H04M 1/04* (2013.01);
(Continued)

(58) Field of Classification Search
CPC ......... H04M 1/72597; H04M 1/72522; H04M 1/7253; H04M 1/72541; H04M 1/72577;
(Continued)

(56) References Cited

U.S. PATENT DOCUMENTS

| 9,055,156 B1 | 6/2015 | Sumsion et al. |
| 9,988,193 B1 | 6/2018 | Koeppel et al. |

(Continued)

FOREIGN PATENT DOCUMENTS

| CN | 202907129 U | 4/2013 |
| CN | 203632825 U | 6/2014 |
| CN | 205304902 U | 6/2016 |

OTHER PUBLICATIONS

"First Office Action and Search Report Issued in Chinese Patent Application No. 201780038666.8", dated Mar. 26, 2020, 11 Pages.

(Continued)

*Primary Examiner* — Ajibola A Akinyemi
(74) *Attorney, Agent, or Firm* — NovoTechIP International PLLC

(57) ABSTRACT

A device including a peripheral interface, user interface, processor and memory in communication with the processor, in which the memory stores executable instructions that, when executed by the processor, cause the processor to control the device to perform functions of detecting an occurrence of a native communication event via a first communication network while the device is in a sleep or locked state; based on the occurrence of the native communication event, generating, via the user interface, a first notification indicating the occurrence of the native communication event detecting an occurrence of a non-native communication event via a second communication network while the device in the sleep or locked state; and based on the occurrence of the non-native communication event, sending, to a peripheral device via the peripheral interface, (Continued)

a signal that causes the peripheral device to generate a second notification indicating the occurrence of the non-native communication event.

20 Claims, 8 Drawing Sheets

Related U.S. Application Data

(60) Provisional application No. 62/361,344, filed on Jul. 12, 2016, provisional application No. 62/353,978, filed on Jun. 23, 2016.

(51) Int. Cl.
*H04M 1/04* (2006.01)
*H04M 1/60* (2006.01)
*H04M 1/72484* (2021.01)
*H04B 1/3877* (2015.01)

(52) U.S. Cl.
CPC ....... *H04M 1/2535* (2013.01); *H04M 1/6033* (2013.01); *H04M 1/72484* (2021.01)

(58) Field of Classification Search
CPC ......... H04M 2242/04; H04M 2242/30; H04M 3/46; H04M 3/5166; H04M 3/53375; H04M 15/00; H04M 15/41; H04M 15/47; H04M 15/66; H04M 19/048; H04M 1/04

USPC ....................................................... 455/557
See application file for complete search history.

(56) References Cited

U.S. PATENT DOCUMENTS

| | | |
|---|---|---|
| 2005/0092641 A1 | 5/2005 | Marsden et al. |
| 2006/0094461 A1* | 5/2006 | Hameed .................. G06F 3/038 |
| | | 455/552.1 |
| 2013/0342638 A1 | 12/2013 | Sobti et al. |
| 2014/0045480 A1* | 2/2014 | Hsieh ..................... G06F 1/1643 |
| | | 455/418 |
| 2014/0175091 A1 | 6/2014 | Michael |
| 2015/0061862 A1* | 3/2015 | Lee ........................ H04W 88/02 |
| | | 340/539.11 |
| 2015/0212967 A1 | 7/2015 | Griffin |
| 2017/0318928 A1 | 11/2017 | Gronewoller et al. |
| 2017/0374188 A1 | 12/2017 | Chalabi et al. |

OTHER PUBLICATIONS

"Second Office Action Issued in Chinese Patent Application No. 201780038666.8", dated Sep. 8, 2020, 5 Pages.
"Office Action Issued in European Patent Application No. 17734213. 6", dated Sep. 16, 2019, 4 Pages.
"Non Final Office Action Issued in U.S. Appl. No. 15/349,568", dated May 30, 2019, 16 Pages.
"Final Office Action Issued in U.S. Appl. No. 15/349,568", dated Nov. 4, 2019, 19 Pages.

* cited by examiner

USER PERIPHERAL

RELATED APPLICATIONS

This application is a continuation of co-pending U.S. patent application Ser. No. 15/402,847, filed on Jan. 10, 2017 and titled "User Peripheral," which claims priority under 35 U.S.C. 119(e) to U.S. Provisional Application No. 62/361,344, filed Jul. 12, 2016 and titled "User Peripheral" and U.S. Provisional Application No. 62/353,978, filed Jun. 23, 2016 and titled "User Input Peripheral," the entire disclosures of which are hereby incorporated by reference.

BACKGROUND

One existing type of peripheral for use with a user terminal such as a mobile phone is a docking station which acts as a speaker phone when the phone is docked in the docking station. This may operate in conjunction with the native dialler of the phone (e.g. a cellular dialler) or a separate application such as a VoIP application. Either way, when the phone is docked the audio to be transmitted from the near-end user to the far end-user(s) is captured by a microphone in the docking station instead of the phone's internal microphone, and transferred from that microphone though the docking connection to the phone, then on to the far-end user terminal(s). And/or, the audio received from the far-end user terminal(s) is not played out through the phone's internal speaker, but rather is transferred from the phone to the docking station via the docking connection and played out through a speaker in the docking station. The docking station usually also supplies power to the phone during the call and charges its battery. The user can answer and control the call in the normal way by navigating through the graphical user interface presented on the display screen of the phone (nowadays typically a touchscreen).

Another type of peripheral is a hands-free headset or earpiece which pairs with a phone via a wired or more often wireless connection, e.g. a Bluetooth connection. In this case, when the phone is so paired, the audio to be transmitted from the near-end user to the far end-user(s) is captured by a microphone in the headset or earpiece instead of the phone's internal microphone, and transferred from that microphone though the pairing connection to the phone, then on to the far-end user terminal(s). And/or, the audio received from the far-end user terminal(s) is not played out through the phone's internal speaker, but rather is transferred from the phone to the headset or earpiece via the pairing connection and played out through a personal speaker in the headset or earpiece. The headset or earpiece often also comprises a set of dedicated mechanical buttons for controlling the call via the pairing connection, with a different respective dedicated function mapped to each button—such as a volume up button for increasing the volume of the playout of the received audio, a volume down button for decreasing the volume, an answer button for answering the call, a hang-up button for terminating the call, and/or a mute button for muting the transmitted audio of the call.

SUMMARY

In an implementation, a device includes a peripheral interface configured to connect the device to a peripheral device, a user interface, a processor and a memory in communication with the processor. The memory includes executable instructions that, when executed by the processor, cause the processor to control the device to perform functions of detecting an occurrence of a native communication event via a first communication network while the device is in a sleep or locked state; based on the occurrence of the native communication event, generating, via the user interface, a first notification indicating the occurrence of the native communication event detecting an occurrence of a non-native communication event via a second communication network while the device in the sleep or locked state; and based on the occurrence of the non-native communication event, sending, to the peripheral device via the peripheral interface, a signal that causes the peripheral device to generate a second notification indicating the occurrence of the non-native communication event.

In another implementation, a method of operating a device to generate a notification when a communication event occurs, includes detecting an occurrence of a native communication event via a first communication network while the device is in a sleep or locked state; based on the occurrence of the native communication event, generating, via a user interface of the device, a first notification indicating the occurrence of the native communication event detecting an occurrence of a non-native communication event via a second communication network while the device in the sleep or locked state; and based on the occurrence of the non-native communication event, sending, to a peripheral device, a signal that causes the peripheral device to generate a second notification indicating the occurrence of the non-native communication event.

In another implementation, a non-transitory computer readable medium contains instructions which, when executed by a processor, cause a device to perform functions of detecting an occurrence of a native communication event via a first communication network while the device is in a sleep or locked state; based on the occurrence of the native communication event, generating, via a user interface of the device, a first notification indicating the occurrence of the native communication event detecting an occurrence of a non-native communication event via a second communication network while the device in the sleep or locked state; and based on the occurrence of the non-native communication event, sending, to a peripheral device, a signal that causes the peripheral device to generate a second notification indicating the occurrence of the non-native communication event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

To assist understanding of the present disclosure and to show how embodiments may be put in effect, reference is made by way of example to the accompanying drawings in which.

DETAILED DESCRIPTION OF EMBODIMENTS

Figure 1:
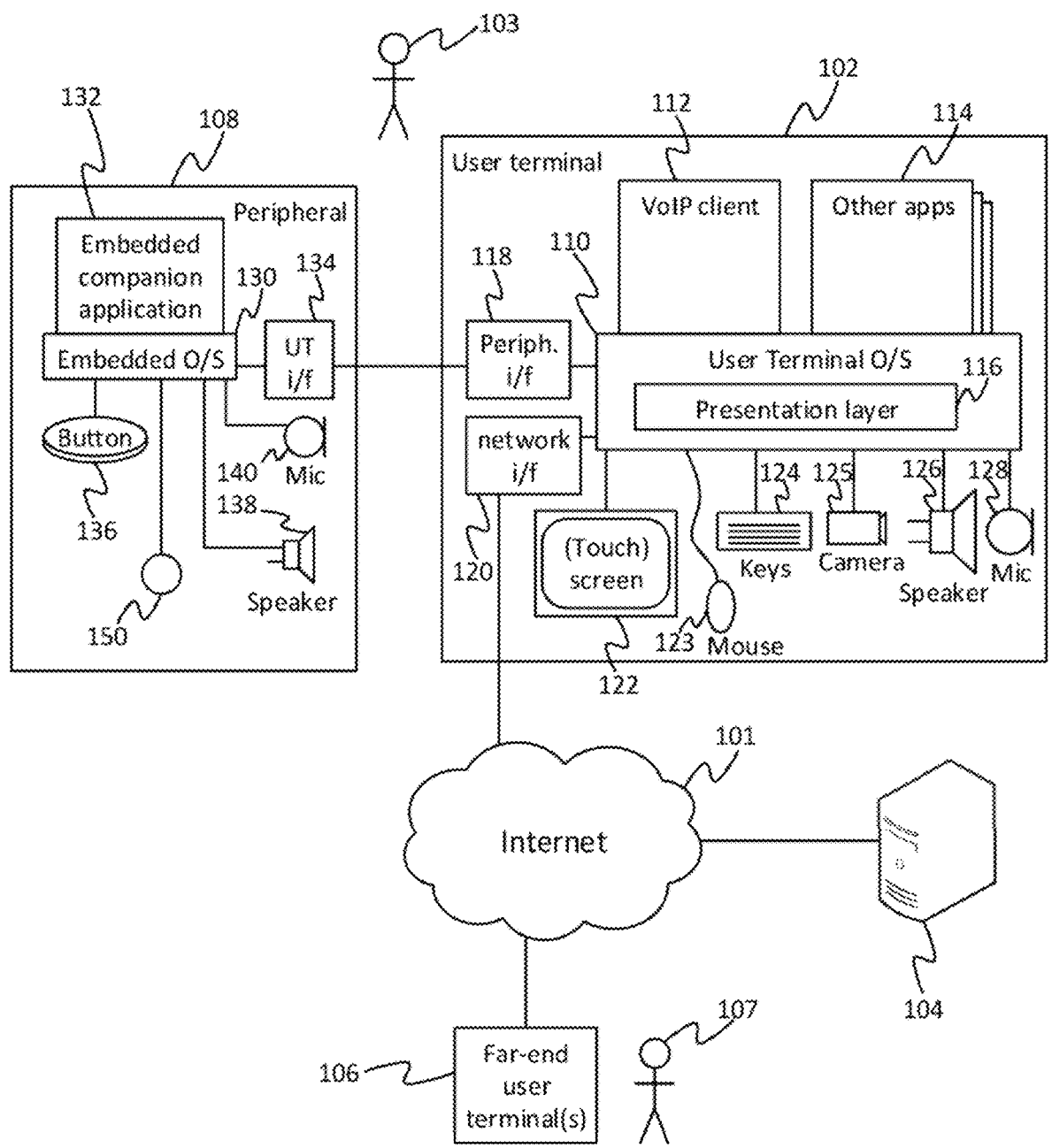
FIG. 1 is a schematic block diagram of a communication system.

FIG. 1 illustrates and example communication system in accordance with embodiments disclosed herein. The system comprises a user terminal 102 such as a mobile phone, tablet, laptop computer or desktop computer; and a peripheral device 108 configured to connect to the user terminal 102. As will be discussed in more detail later, the peripheral 108 may take any of a variety of forms such as a docking station, headset, earpiece or dedicated button unit. The peripheral device 108 may also be referred to as a hardware accessory in that, while it may in embodiments run embedded firmware, it is a relatively simple device with a dedicated purpose and only a single or a small number of user input controls (e.g. no more than the buttons) and preferably no screen (though in embodiments it is not excluded that the peripheral 108 could have a small screen for some simple or dedicated purpose).

The user terminal 102 comprises an operating system 110, a communication client application 112, and one or more other applications 114 (e.g. in embodiments over one hundred applications, or "apps", and even up to hundred to three hundred applications or more). The operating system 110, communication client 112 and other application(s) 114 are stored on a storage means of the user terminal 102 and arranged to be run (either executed or interpreted) on a processor of the user terminal 102, and to thereby perform the various operations attributed to them herein. The storage on which the operating system 110, communication client application 112 and other application(s) 114 are stored may comprise any one or more storage media implemented in one or more memory units. E.g. the storage means may comprise an electronic storage medium such as an EEPROM (or "flash" memory) and/or a magnetic storage medium such as a hard disk. Note also that the term "processor" as used herein does not exclude that the processor may comprise multiple processing units. The communication client application 112 and other application(s) 114 are each separate applications from one another, individual applications at least in that they are scheduled independently by the operating system 110, and/or can be launched, run and closed independently of one another.

The user terminal 102 also comprises one or more input devices for outputting information to the user 103 and one or more output devices for receiving information from the user 103 (which may be referred to collectively as i/o devices). These include one or more media output devices for outputting audio and visual information from the applications 112, 114 to the user 103, i.e. at least one speaker 126 and a screen 122, respectively. The i/o devices also include one or more media input devices for receiving audio and optionally video information from the user 103, i.e. as a microphone 128 and optionally a camera 125. Furthermore, the i/o devices comprise one or more user input devices enabling the applications 112, 114 to receive user selections from the user 103, such as a mouse or trackpad 123, a set of keys 124 (e.g. a keyboard or keypad), and/or a touchscreen 122 (the screen 122 may or may not be a touchscreen capable of both outputting visual information and receiving inputs form the user 103). The operating system 110 running on the user terminal 102 is an end-user operating system, i.e. designed for user terminals to provide an interface to the end user 103, to present information from applications 112, 114 to a user 103 through a graphical user interface presented on a screen 122, and to receive back inputs to the applications 112, 114 from the user 103 through one or more user input devices 122, 123, 124, 125, 128. As such the user operating system 110 comprises a presentation layer 116. The presentation layer 116 is the layer disposed between the application layer 112, 114 and lower layers (not shown), which formats data from the lower layers to be presented to the application layer 112, 114, and formats data from the application layer 112, 114 to be presented to the lower layers. This includes responsibility for painting graphical user interface on the screen, and receiving inputs from the user selections from the user input devices 122, 124 in relation to the graphical user interface.

Note that each of the i/o devices 122, 123, 124, 125, 126, 128 may be internal or external to the main housing in which the processor running the applications 112, 114 is housed, e.g. as follows. In embodiments the screen 122 may be an integral screen of a smartphone, tablet or laptop or an external screen of a desktop computer. The set of keys 124 may be an integral key set of a smartphone or tablet, an integral keyboard of a laptop or an external keyboard of a desktop computer. The (at least one) speaker 126 may be an internal or external speaker of a smartphone, tablet or laptop, or an external speaker of a desktop computer. The microphone 128 may be an internal or external microphone or a smartphone, tablet or laptop, or an external microphone of a desktop computer. The camera 125 may be an internal camera of a smartphone, tablet or laptop, or an external camera connected to a laptop or desktop computer. If used, a mouse 123 is an external device, but this could instead be an integral trackpad or tracker ball of, say, a laptop computer.

The user terminal 102 further comprises a network interface 120 and a peripheral interface 118.

The network interface 120 enables the user terminal 102 to connect to a packet-based network 101 comprising one or more constituent networks. E.g. in embodiments the network 101 may comprises a wide area internetwork such as that commonly referred to as the Internet. Alternatively, or additionally, the network 101 may comprise a wireless local area network (WLAN), a wired or wireless private intranet (such as within a company or an academic or state institution), and/or the data channel of a mobile cellular network. To connect to such a network, the network interface 120 may comprise any of a variety of possible wired or wireless means as will be familiar to a person skilled in the art. For example, if the network 101 comprises the Internet, the network interface 120 may comprise a wired modem configured to connect to the Internet via a wired connection such as a PSTN phone socket or cable or fibre line, or via an Ethernet connection and a local wired network. Or alternatively the network interface 120 may comprise a wireless interface for connecting to the Internet via a wireless access point or wireless router and a local (short-range) wireless access technology such as Wi-Fi), or a mobile cellular interface for connecting to the Internet via a mobile cellular network.

The connection to the network 101 via the network interface 120 allows applications 112, 114 running on the user terminal 102 to conduct communications over the network. This includes enabling the communication client application 112 to conduct a voice or video call with another instance of the client application running on a remote user terminal 106, being used by a remote user 107. As a matter of terminology the user terminal 102 from the perspective of which a given communication scenario is being described may be referred to as the near-end terminal, whilst the other, remote user terminal 106 with which the near-end terminal 102 is communicating may be referred to as the far-end terminal (and similarly for the near-end user 103 and far-end user 107 respectively). Not also that the call could in fact be a conference call conducted with multiple remote user terminals and their respective users. By way of illustration the following will be described in terms of a given remote-user terminal 106, but it will be appreciated that the same teachings can be readily extended to multiple remote user terminals in a similar manner.

The communication client 112 on the near-end user terminal 102 is configured so as, when run on the near-end user terminal 102, to receive audio data from the microphone 128 and optionally also video data from the camera 125, and to send this data over the network 101, via the network interface 120, to be played out at the far-end terminal as part of a call conducted between the near-end user 103 and far-end user 107. Further, the communication client 112 is configured so as when run on the user terminal 102 to receive via the network interface audio and optionally video data from the client on the far-end terminal 106 to be played out through the speaker 126 and screen 122, respectively, on the near-end terminal 102.

In embodiments the communication client 112 is a VoIP client configured to conduct the call in the form of a VoIP call (which may also comprise a video element). The VoIP client may optionally also provide additional functionality such as instant messaging (IM). In some embodiments the audio and/or video content of the call may be routed via a server 104 of a provider of a communication service used to conduct the call (where a server as referred to herein may comprise one or more physical server units at one or more geographical sites). Alternatively, some or all of the audio and/or video content of the call may be sent directly over the network 101 between the near-end and far-end user terminals 102, 106, i.e. without being relayed by the server 104. In the latter case the server 104 may nonetheless provide some supporting functions such as: to provide address look up (or this could be done in a P2P fashion); to issue digital authentication certificates by which users 103 and 107 may prove their identities to one another; to store respective contact lists of the users 103 and 107, being a list of other users the respective user has agreed to accept as contacts for communicating with within the communication service; to store profile information of each user which is viewable by other users within the communication service; and/or to maintain presence information indicating to other users whether the respective user's availability to be communicated with within the communication service.

The communication client may be arranged to conduct a call or meeting using a proprietary internet telephony protocol, such as the Skype protocol, or Microsoft Notification Protocol 24 for example.

In embodiments, the communication client application (e.g. VoIP application) 112 may be an application other than the native dialler of the operating system 110, i.e. the default dialler user for telephone calls, which is either one of the other applications 114 or an integrated function of the operating system 110 itself.

As such, the client application may not have access to native notification processes of the user terminal such as audio or video outputs from speaker 126 or touchscreen 122, or a haptic output such as a vibration, which are typically controlled by the OS 110 of the user terminal.

The communication client application 112 is configured so as when run on the near-end user terminal 102 to present the user with a graphical user interface of the client, enabling the user to control various call-related functions, such as to answer an incoming request to establish the call from the client on the far-end user terminal 106 (if it is an incoming call, i.e. initiated by the far-end user), or to send a call establishment request to the client on the far-end user terminal 106 requesting to establish the call (if it is an outgoing call, i.e. initiated by the near-end user). Other examples of call related functions which the user may control through the GUI of the client 112 include muting the transmitted audio of the call (so the near-end user can't be heard by the far-end user), turning the volume of the received audio up or down, or selecting the far-end user 107 from a contact list (to establish the call if it is an outgoing call), or selecting to view profile information of the far-end user 107.

However, when using the GUI of the communication client application 112 on the user terminal 102, the user 103 typically has to follow several steps in order to perform simple tasks. For example, to join a scheduled meeting, they must first find and navigate to an app, launch the app or bring it to the foreground, then navigate to the screen, locate the next meeting and then select the join meeting item. Any indications such as incoming or missed calls, must also be alerted with the user terminal which may be running other application s or have limited screen space available for example. This can be further complicated if the user's mobile device is in a locked state. This inconveniences the user and gets in the way of them using apps like VoIP applications efficiently and frequently.

Another possibility is to connect a hardware accessory (a peripheral) to the user terminal 102. Conventionally each of the controls on the peripheral maps directly to a specific function within the application on the user terminal 102. For example, a play button on a Bluetooth speaker may cause music or other audio to start playing on a connected mobile terminal, or a mute. In some cases, the connection of the peripheral to the user terminal 102 may also cause a particular application (e.g. a mobile app) to be launched upon connection (wired or wireless), or else the application may be launched upon activation of an on-screen control on the user terminal 102. However, to have multiple different functions, the user still has to manually select from amongst multiple different controls, whether on the peripheral or on-screen or a combination of such controls.

To address such considerations or similar, the following discloses a peripheral 108 that connects to the user terminal 102 (by either a wireless or wired connection) and that can provide an indication of an event or state such as an incoming call or a live meeting. The peripheral can be activated, optionally in response to such an indication, either by a simple gesture such as touching, clicking or waving, or by voice or audio command. When the control is activated, it causes a signal or message to be sent to a particular application 112 or 114 running on the user terminal 102 which then responds by executing a contextual application function or series of functions.

Thus, rather than having an accessory that simply causes an application to launch or one that has controls that map directly in a one-to-one manner to function within an application, there is provided an accessory control that maps indirectly to functionality within one or more apps that: i) may behave differently in different application states, screens or contexts within the same app; ii) may behave differently in different applications running on the same connected terminal 102 and iii) where the control may be emplaced on a variety of accessory types and connected via wired or wireless methods.

For example, if a user is not currently using the communications application 112, then activating the accessory control may cause the client 112 to launch or come to the foreground; but if the user is already in the application 112, activating the same control may cause the client application 112 to join a meeting (e.g. by VoIP); whereas if the user 103 is already in a meeting (e.g. VoIP meeting), activating the same control may cause the user to be muted within the meeting. This thus provides a smart control accessory that serves as a smart application shortcut.

The GUI of the communication client application 112 on the user terminal 102 may also be used to provide user indication of a voice and/or video call event or state. For example, an indication may be provided of an incoming call, a live meeting or conference call in progress, a missed call, a voicemail or voice message, a text message or instant message, a mute state or an app launch.

The user terminal will typically provide native notification or indication functions, such as audio alert such as a ring or other tone, or a haptic output such as a vibrate function. This is typically accompanied with a graphical indication displayed on screen, which can provide further information regarding the nature of the event or state, such as the sender of an incoming message.

These native functions are typically controlled by the OS 110 of the user terminal. While these functions may be accessed by, and designed in conjunction with the native dialler or communication service of the user terminal, an application such as the client application 112 may not be able to access or control these functions freely. This may particularly be the case if the client application is not active, or is running in the background.

Therefore, indications relating to a communication service provided or enabled by client application 112, such as an internet telephony service (e.g. VoIP) may, in embodiments, not be able to be provided by such native functions and may need to rely on other means. One example is an on-screen notification, such as an icon or message in a header or a banner message. This is intended to alert the user and permit him or her to enter an application within a particular context by selecting the notification on screen. However, the user still has to manually handle the user terminal 102, which is not necessarily desirable, e.g. for a complete hands free experience. For instance, the user still has to approach the user terminal 102 to see the notification and discern its content, and select a small and potentially fiddly on-screen control to accept the notification.

It may therefore be desirable for a hardware accessory (a peripheral 108), such as that described above for example, to be able to provide an indication of a communication service event or state, based on a notification received from a communication client application 112 for example.

An example implementation of the peripheral device 108 is illustrated in FIG. 1. As shown, the user terminal 102 comprises a peripheral interface 118, and the peripheral device 108 comprises a user terminal interface 134, for connecting the peripheral 108 to the peripheral interface 118 of the user terminal; thus enabling the peripheral device 108 and the communication client application 112 running on the user terminal 102 to exchange control commands. This connection could be any suitable wired or wireless means. For instance, the peripheral interface 118 may comprise a physical port comprising a mechanical connector for forming a wired connection with the user terminal interface 134 on the peripheral device 108 (the user terminal interface 134 on the peripheral 108 comprising the complimentary mechanical connector). E.g. the peripheral interface 118 may comprise a USB port, mini USB port, or micro USB port, and the user terminal interface 134 may comprise the corresponding USB plug. A further example is a so-called "Lightening" port or connector, which is a proprietary computer bus and power connector created by Apple Inc. As another example, the connection may be by any of a variety of wireless means. For instance, the peripheral interface 118 and corresponding user terminal interface 134 may comprise a pair of wireless interfaces arranged to connect together via a local RF technology such as Wi-Fi, Bluetooth, ZigBee, or Thread. Note also that in the case where both the peripheral interface 118 and network interface 120 comprise a wireless interface, these may or may not comprise the same physical interface. For example, these may comprise the same physical wireless interface using the same wireless access technology (e.g. Wi-Fi) and simply comprise different logic (e.g. software) for interfacing with the peripheral 108 and network 101 respectively. Alternatively, the peripheral interface 118 and network interface 120 may comprise different physical interfaces arranged to use different wireless access technologies, e.g. the peripheral interface 118 may be a Bluetooth interface whilst the network interface 120 may be a Wi-Fi interface.

The peripheral device 108 comprises control logic in the form of an embedded companion application running on an embedded operating system 130 on the peripheral, to act as a companion to the communication client application 112. The embedded operating system 130 and companion application 132 are stored on a storage means of the peripheral device 108 and arranged to be run (either executed or interpreted) on a processor of the user peripheral device 108, and to thereby perform the various operations attributed to them herein. The storage on which the embedded operating system 130 and companion application 132 are stored may comprise any one or more storage media implemented in one or more memory units. E.g. the storage means may comprise an electronic storage medium such as an EEPROM (or "flash" memory) and/or a magnetic storage medium such as a hard disk. Also, not again that the term "processor" as used herein does not exclude that the processor may comprise multiple processing units.

As an alternative (or in addition) to the embedded companion application 132, the control logic may be implemented (or partially so) in the form of dedicated hardware circuitry, or configurable or reconfigurable hardware circuitry such as a programmable gate array (PGA) or field programmable gate array (FPGA).

Either way, whether implemented in software, hardware circuitry or a combination of the two, the peripheral 108 may be described as a "hardware accessory" in that it is a simple, low-level peripheral device that cannot be used as a stand-alone user terminal without being connected as a peripheral to a user terminal 102. For example, in embodiments the operating system on the peripheral 108 does not comprise a user operating system designed to provide a graphical user interface to the user 103, but instead comprises an embedded operating system that does not comprise a presentation layer. Furthermore, preferably the peripheral device 108 does not comprise any display screen.

In embodiments the peripheral 108 may optionally comprise one or more lights 150 (e.g. LEDs) which are arranged to provide an indication to the near-end user 103 of a certain state or event of the communication client application 112 (e.g. VoIP application) or a certain predefined event occurring within the communication service (e.g. VoIP service).

Considering a light or lights, these may be mounted in or on the peripheral device to emit light output visible to a user. A light may refer to a single light emitting element, or to a group of elements grouped to provide a single light output which is controllable between different states. For example, a combination of coloured LEDs can be grouped (optionally with a dedicated driver or control electronics) as a single light source to provide a plurality of different colour outputs in response to a control signal. Furthermore, one or more separate lights or light sources, even if spaced apart from one another, can be provided with a cover or diffuser, to provide an output which is perceived substantially as a single light output.

Thus it will be understood that the light or lights can provide a variety of different light outputs in terms of different light parameters such as colour, brightness, and dynamic effects (such as flashing or pulsing for example). Different light outputs can be used to indicate different events or states accordingly.

Separate light outputs, physically distinguishable from one another can be used to indicate different states. For example, one light in a first position on the device can indicate an incoming call, and another light in a different position can indicate a live meeting pending.

However, this may lead to a cluttered appearance, particularly on a device with a small for factor, and may cause confusion. Therefore, it may be desirable to use only a small number, or only a single light output, and to use different light parameters to indicate different events or states. Furthermore, a single output may indicate a different event or state depending on the status of a call or communication event. The table below provides an example of a light output, which has variable parameters of colour and dynamic effect, and the events or states indicated:

| Colour | Solid (static) | Pulsing/Flashing |
| --- | --- | --- |
| None (off) | Not connected | N/A |
| White | Connected | Incoming call, Live meeting, Missed call, Voicemail, App launch |
| Blue | In call | In call with audio muted |

Additionally, or alternatively, the indication can be provided by audio means, output from a speaker or speakers 138 for example. In an analogous fashion different sounds can be assigned different states or events.

The peripheral device 108 may comprise at least one actuator 136, arranged to be simply and accessibly actuated by the near-end user 103. In embodiments the actuator 136 takes the form of a button arranged to be actuated by being pressed or touched by the user 103. Note that the term "button" does not necessarily limit to a mechanical mechanism with a moving or parts (though that is certainly one possibility for the actuator). In embodiments the button may comprise a mechanical button such as a push button, slide switch, rotational switch or toggle switch. Alternatively, the button may take the form of a touch sensor such as a capacitive touch sensor, which is actuated when it senses the touch of user's finger against an exterior surface of the touch sensor. In other alternative embodiments, the actuator may not be button, but rather a motion sensor comprising one or more motion sensor elements (e.g. one or more accelerometers, motion sensors and/or tilt switches) arranged to be actuated when it/they sense the peripheral device 108 being moved by the user 103, or when a particular predefined motion is sensed. As yet another alternative, the actuator 136 comprises a microphone and voice recognition algorithm arranged to be actuated in response to detecting a predetermined voice command from the user, or more generally an audio recognition algorithm arranged to detect a predetermined audio command (e.g. the user clapping his or her hands, clicking his or her fingers, or whistling).

Preferably the peripheral device comprises very few buttons, e.g. no more than three buttons. In embodiments the actuator 136 is the only user-operable button on the whole peripheral 108, or in embodiments that use motion or audio actuation, then the peripheral 108 could even comprise no buttons.

In some embodiments the peripheral 108 may additionally be configured to provide the function of a speaker phone, comprising at least one integrated speaker 138 and/or at least one integrated microphone 140. Thus the peripheral may be configured such that when connected to the user terminal 102, one or both of: (a) the received audio of the call from the far-end user 107 can be played out through the speaker 138 of the peripheral 108 instead of the speaker 126 of the user terminal 102, and/or the audio of the call captured from the near-end user 103 to be transmitted to be played out to the far-end user 107 is a captured through the microphone 140 on the peripheral 108 instead of the microphone 128 of the user terminal 102. The peripheral may further comprise one or more lights or light sources 150.

As will now be exemplified with reference to FIGS. 2 to 10, the peripheral device 108 may take any of a variety of different forms. Note that the particular aesthetic design of the user terminal 102 and its GUI shown in FIGS. 3, 4, 5, 7, and 8 is purely an example for illustrative purposes and does not form part of any subject matter to be claimed herein.

In embodiments the user terminal may take the form of a mobile user terminal such as a smartphone, tablet or laptop, and the peripheral device 108 may take the form of a docking station into which the mobile terminal 102 can be docked in order to form said connection between the peripheral interface 118 of the mobile terminal 102 and the user terminal interface 134 of the peripheral 108. The docking station may also be configured to charge a battery of the mobile terminal 102 when so docked.

Figure 2:
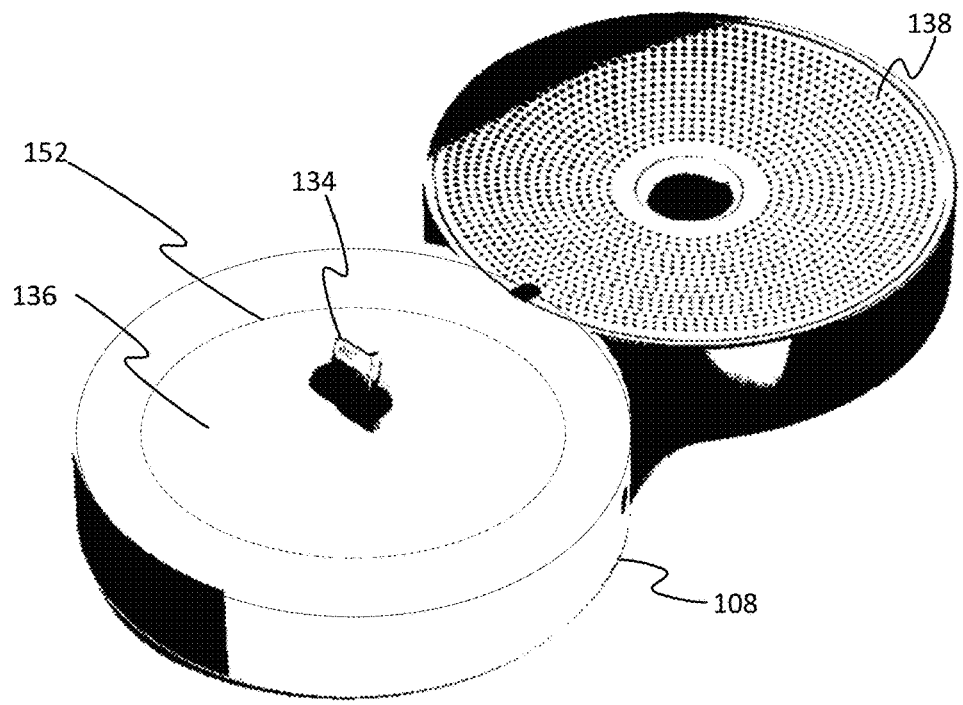
FIG. 2 shows an example design of a docking station.
Figure 3:
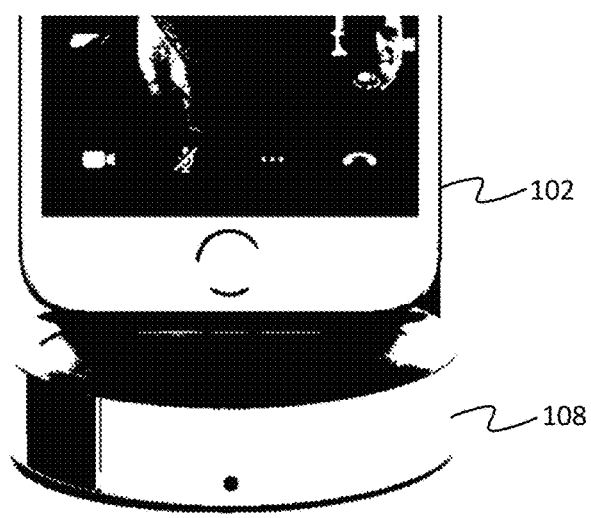
FIG. 3 shows a user terminal docked with a docking station.
Figure 4:
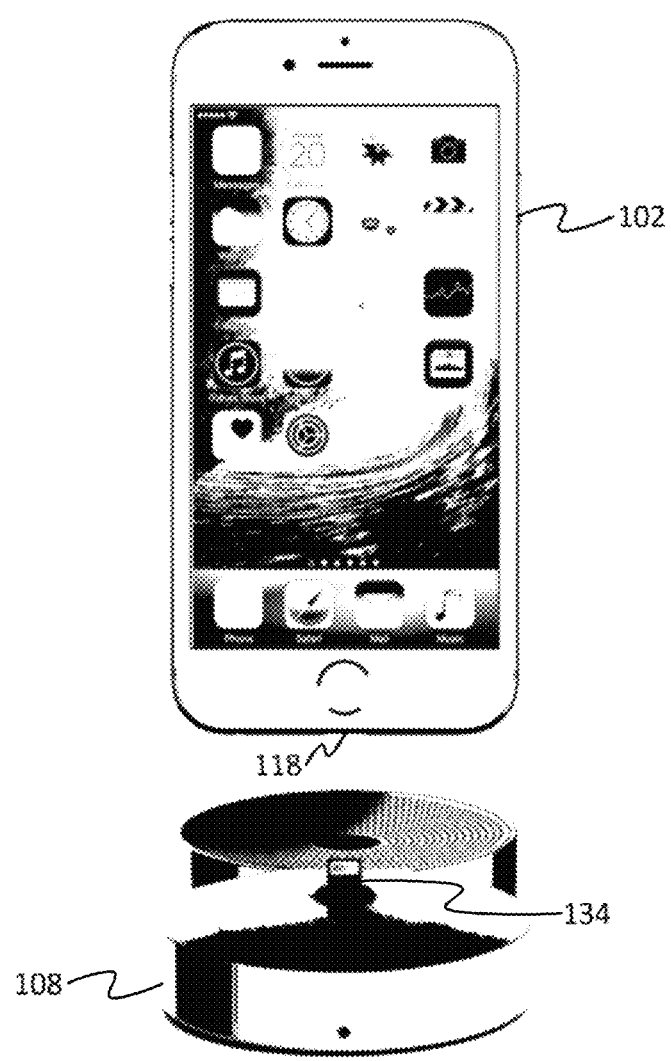
FIG. 4 shows a user terminal docking with a docking station.
Figure 5:
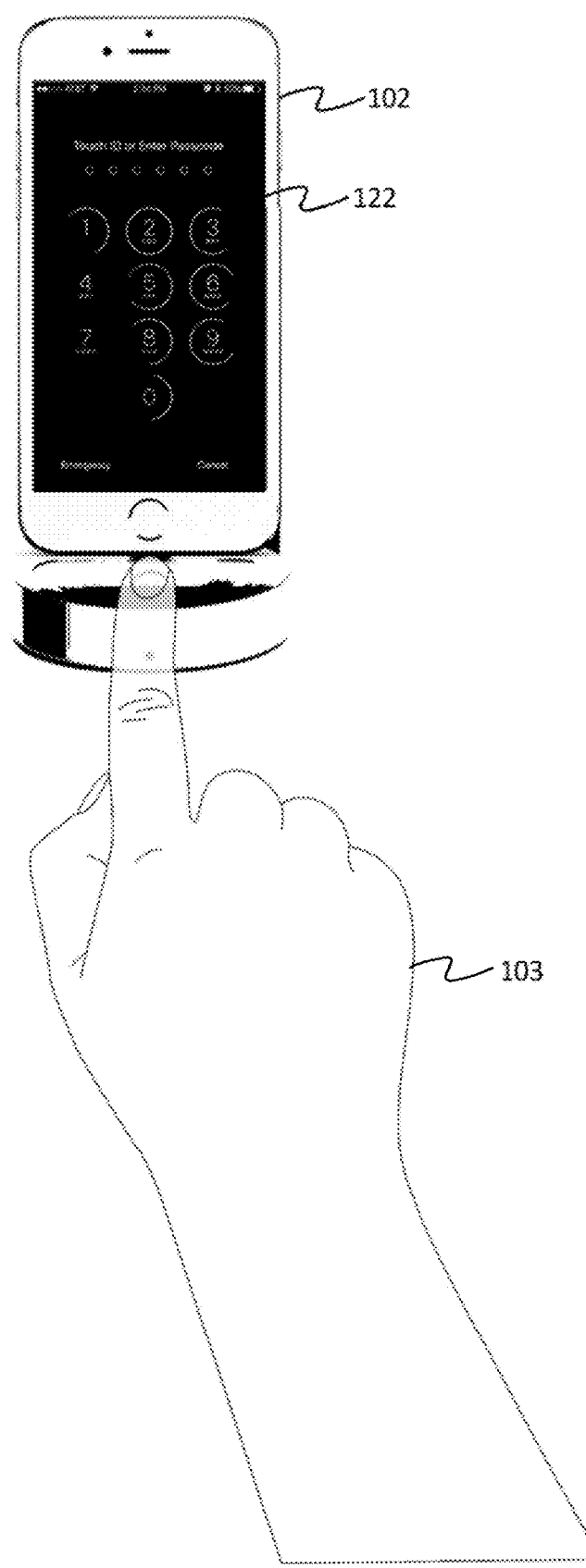
FIG. 5 shows a user pressing a button of a docking station to answer an incoming call, FIG. 6 gives a schematic side and top view diagrams of an example docking station.

An example of this is illustrated in FIGS. 2 to 6. In this example the docking station 108 is also arranged to act as a speaker phone (see above) when the mobile terminal 102 is docked with the docking station 108. FIGS. 2 to 6 show different views of the same example design. As illustrated in FIGS. 2 and 5, the docking station 108 may comprise a base segment 601 and a cover segment 602, movably connected via a movable joining element 603 such as a hinge so that the cover segment 602 can be opened to reveal the port 134 for connecting to the mobile terminal 102 (e.g. this may comprise a mechanical port such as a USB port, mini USB port, or micro USB port). Thus when the cover 602 is opened, the mobile terminal 102 can be docked with the docking station in order to provide the various functionality described herein.

In such embodiments, one or more lighting devices are preferably provided on the base segment 601. In one embodiment one or more light sources are provided inside the base segment, and the top surface of the segment is translucent, allowing the output of such light sources to be viewed through the casing of the base segment. The casing may act as a diffuser, giving the effect of a portion of the casing indicated by dashed line 152 acting as a single light source. In this way the light output can be viewed when a user terminal such as a mobile phone is docked in port 134.

Figure 6:
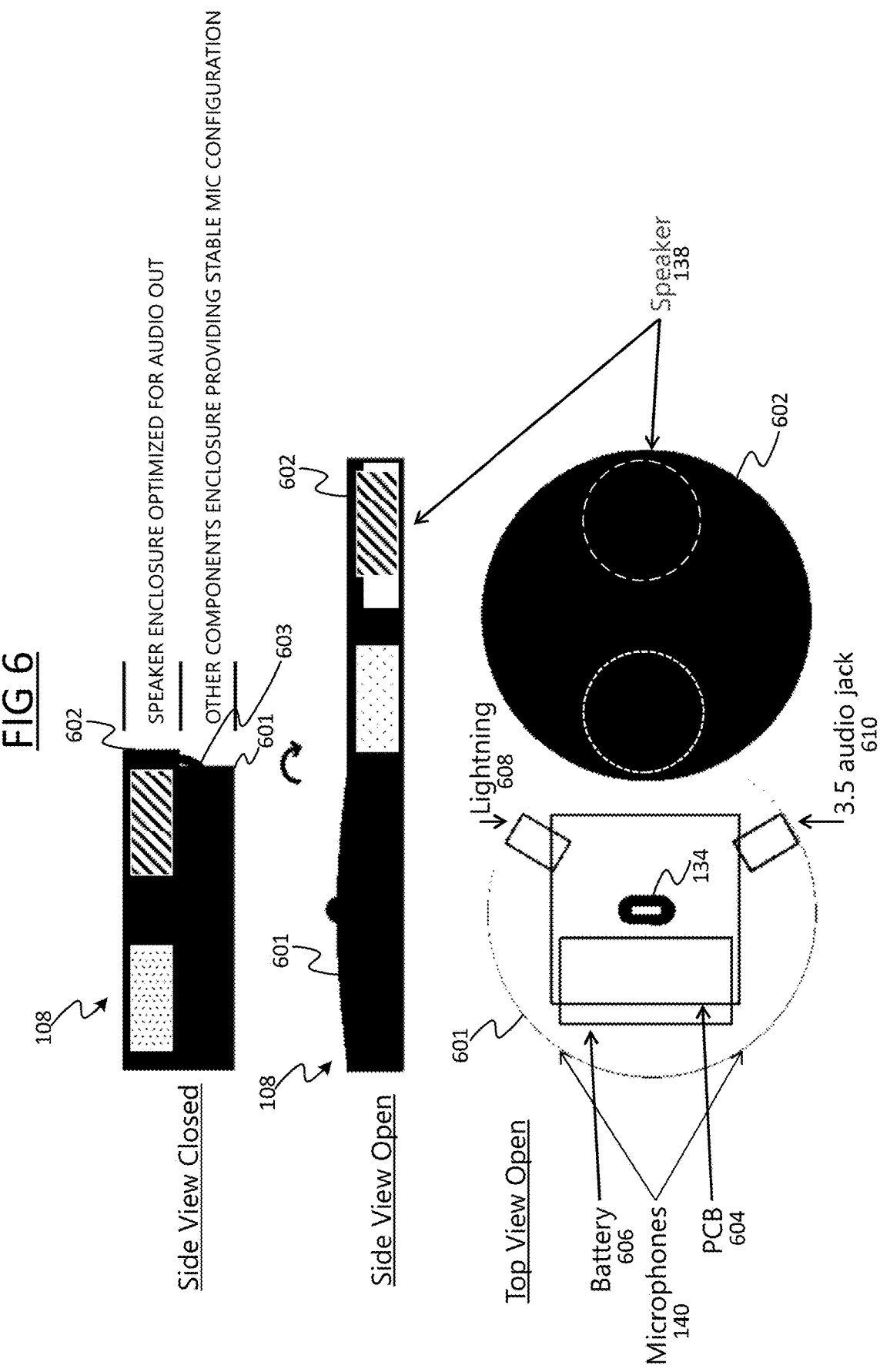

It is desirable for the light output to be visible also when the docking station is in a closed state, as shown in the upper portion of FIG. 6. To this extent, the sides, or a portion of the sides of the base segment 601 may also be translucent, to allow light output from these portions, which are not obscured when in a closed state. A further possibility is for a small separation to remain between the base segment 601 and cover segment 602 in the closed configuration, at least at the perimeter of the device, so that light emanating from the top surface of the base section can "leak" out, providing a "ring" or "halo" effect around the perimeter of the device.

In such embodiments, the actuator 136 preferably takes the form of a single button on the top surface of the base segment 601, e.g. a button in the form of a touch sensor element or possibly a mechanical push button. In embodiments the button is a touch sensor and appears outwardly to the user 103 (i.e. aesthetically) to be continuous with the rest of the base segment 601. Preferably this is the only user input control on the exterior of the docking station 108, or at least other than on its underside which is not visible to the user 103 when placed in the intended orientation on a supporting surface such as a table.

In embodiments the speaker (or speakers) 138 may be incorporated in the cover segment 602 while the microphone (or microphones) 140 may be incorporated in the base segment 601.

In embodiments the docking station 108 may optionally comprise one or more further components, for example the docking station may comprise an additional audio input such as a jack socket 610 (e.g. a 3.5 mm jack socket) allowing the user 103 to plug an audio device other than the mobile terminal 102 (e.g. a dedicated music player) into the docking station and have audio played out from the audio device through the speaker(s) 138 of the docking station 108. Further, in embodiments, the control logic 132 (e.g. the embedded memory storing the embedded operating system 130 and companion application 132) may be mounted on a printed circuit board incorporated inside the housing of the base segment 601.

Figure 7:
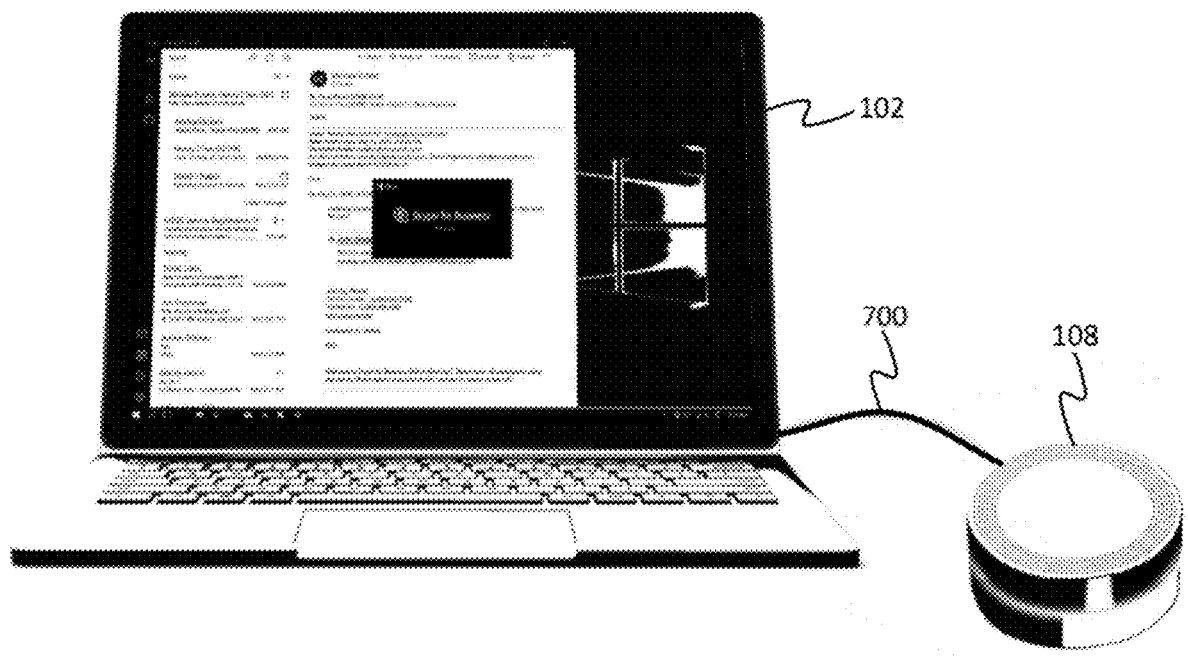
FIG. 7 shows an example of a peripheral connecting to a laptop.
Figure 8:
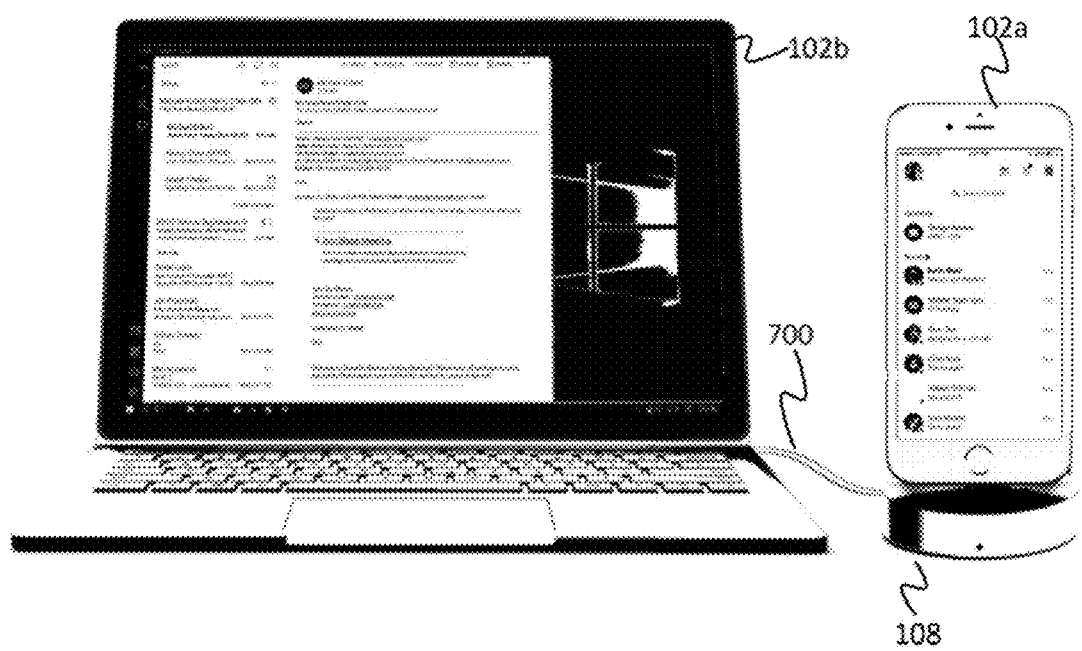
FIG. 8 shows an example of a docking station connected to a laptop, FIG. 9 schematically illustrates a peripheral in the form of a stand-alone button unit, and FIG. 10 schematically illustrates a peripheral in the form of a headset.

Referring to FIG. 7, in some embodiments the docking station 108 may further be configured so that it can be connected to another type of user terminal 102 such as a laptop or desktop computer via a cable connection 700 or similarly by a wireless connection such as a Wi-Fi or Bluetooth connection. Or the peripheral 108 may not take the form of a docking station but rather a unit for connecting to a laptop, desktop computer, or even a smartphone or tablet via such a wireless or cable connection 700. Either way, the peripheral 108 may be configured such that it can provide any of the above-described functionality via this connection 700, with the laptop, desktop, or other device as the user terminal 102. In some embodiments, as shown in FIG. 8, the peripheral 108 may take the form of a docking station 108 that can simultaneously both connect to a larger user terminal such as a laptop or desktop via a wireless or wired connection 700 and also receive a smaller docked mobile user terminal such as a smartphone or tablet into its docking port. In this case the call functionality may be provided via a combination of a first near-side instance of the client application 112 running on the smaller user terminal and a second instance of the client application 112 running on the larger user terminal. In embodiments the control logic 132 on the peripheral can control one or both of them in order to control the relevant function of the call.

Figure 9:
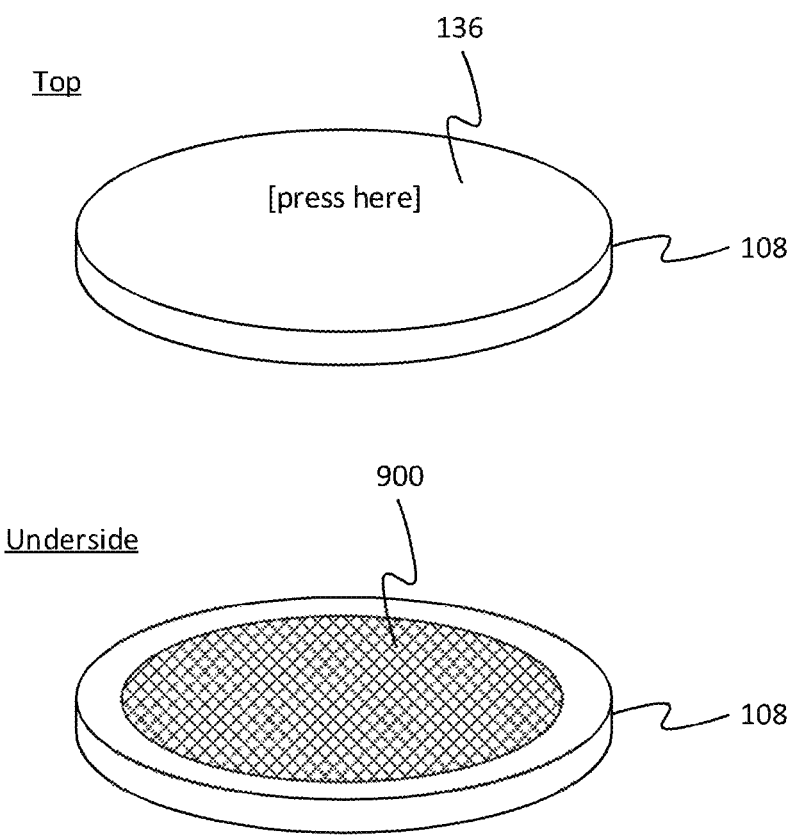

An alternative form for the peripheral device 108 is illustrated in FIG. 9. Here the peripheral 108 takes the form of a dedicated, stand-alone button unit, e.g. about the size of a large coin or not much larger. In this embodiment the button unit 108 preferably comprises only a single button (i.e. the actuator 136) and no other user input control, at least not on its exterior surface. The actuator 136 takes the form of a button on the upper surface of the button unit, e.g. a touch sensor element or a mechanical push button. On the underside of the button unit 108 is a magnetic or adhesive layer 900 for affixing the button unit to another, external surface, e.g. a surface of the user terminal 102 on which the client application 112 to be controlled is installed. In such embodiments the user terminal interface 134 comprises a wireless interface such as a Bluetooth or Wi-Fi interface so the button unit 108 can communicate with and control the client application 112 for any of the above-described purposes.

In some particular embodiments, the button unit 108 may take the form of a refrigerator magnet, the layer 900 being a magnetic layer (N.B. the "layer" need not be of any specific width, depth or other dimensions as long the magnetism is sufficient to support the weight of the button unit 108). In this embodiment the user terminal 102 may be the refrigerator itself if it is a smart refrigerator with embedded communications functionality. Alternatively, the user terminal 102 may be another device such as a smart phone, tablet, laptop, or desktop within range of the refrigerator magnet's wireless interface 134.

Figure 10:
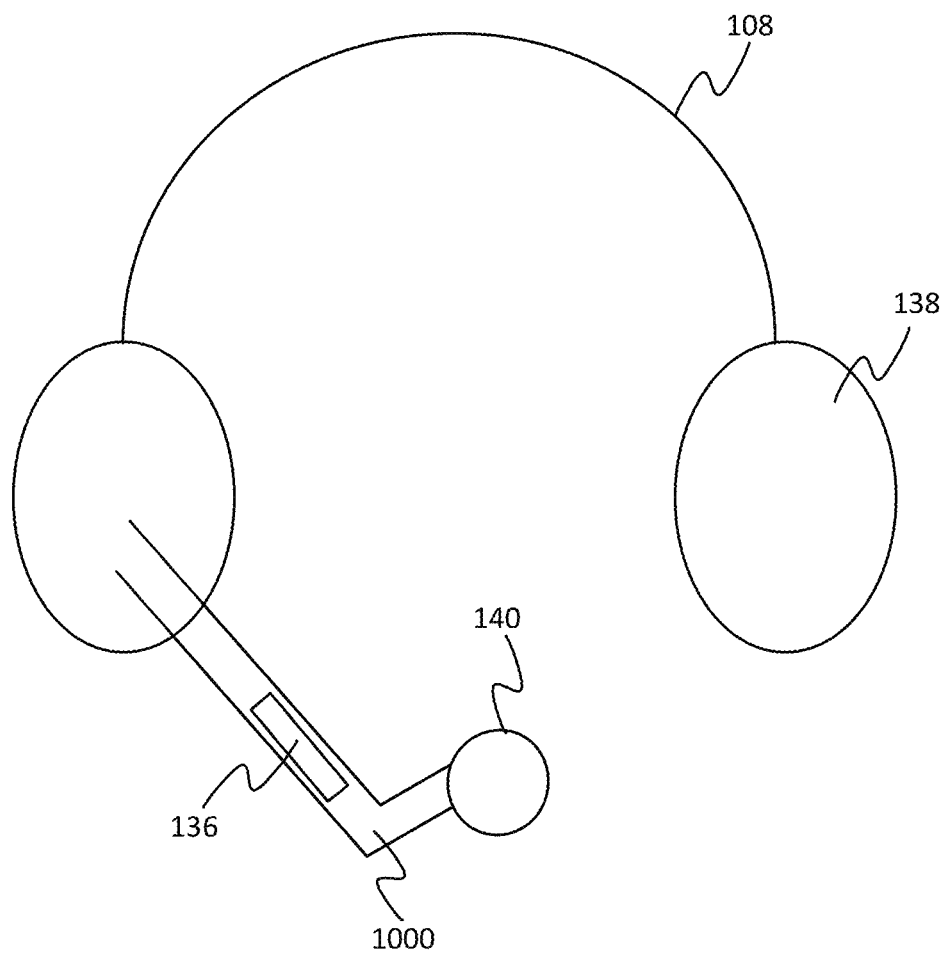

An alternative form for the peripheral device 108 is illustrated in FIG. 10. Here the peripheral 108 takes the form of a headset, e.g. a Bluetooth headset. The headset comprises one or a pair earphones which provide the speakers 138 of the peripheral 108, and a microphone arm 1000 on the end of which the microphone 140 of the peripheral 108 is mounted; the microphone arm 1000 being arranged to hold the microphone 140 near the user's mouth. In this example the actuator 136 may take the form of a button such as a touch sensor element or mechanical push button placed on the exterior of the headset, e.g. on the microphone arm 1000 or on the outer casing of one of the speakers 138. In another somewhat similar embodiment, the peripheral device may take the form of an earpiece such as a Bluetooth earpiece.

Note that as shown in FIG. 5, in embodiments the system is arranged such that the near-end user 103 can answer an incoming call from the far-end user even when it the near-end user terminal 102 is in a locked mode, e.g. even when the touchscreen 122 of the near-end user terminal 102 is locked. As will be familiar to a person skilled in the art, the operating system 110 on the user terminal 102 typically has an unlocked mode and a locked mode, wherein in the locked mode the operating system 110 will only allow the user terminal 102 to react to user inputs (e.g. via the touch screen) in specific circumstances more limited than in the unlocked mode, but not otherwise. These circumstances may include that the user 103 has entered a secret code such as a personal identification number (PIN) or secret pattern required to return the operating system 110 back to the unlocked mode, or that an application 112, 114 on the user terminal 102 has received a push notification from an external entity (e.g. a server or another user terminal) over the network 101. The operating system 110 may be configured to automatically fall into the locked mode after a certain predetermined time period has elapsed since a user input was last received by the user terminal 102, and/or may be configured such that the user 103 can manually place it into the locked mode.

Similarly, an indication of said incoming call, or of another communication event or state notified by the communication client application can be provided by the peripheral device which the user terminal is in the locked state. By providing a visual output such as a light output, and/or an audio output, a user can be alerted even if certain functions of the user terminal are not enabled in a locked state. This may also be true of a sleep mode, where the screen of a user terminal and possibly other functions are powered down. Even if native notifications are available to a default messaging or call service (e.g. a native communication application) in a locked or sleep state, the same may not be true for all applications, such as a third party communication client application.

This may be particularly useful for indicating a missed call or a voicemail, which for certain user terminals are only indicated on a display screen, which in turn can only be activated by a button press or other physical interaction with the user terminal.

Thus, in embodiments a mechanism is put in place whereby the near-end user 103 can answer an incoming call from the far-end user 107 by actuating the actuator 136 on the peripheral device 108 despite the operating system 110 on the user terminal being in the locked state. To enable this, the operating system 110 is configured to still allow a peripheral to communicate with an application 112, 114 when the operating system 110 is in the locked or sleep state.

When the communication client application (e.g. VoIP application) 112 is first installed on the user terminal 102 it registers with a push notification service provided by the server 104 of the communication service provider. Subsequently, when the far-end user 107 attempts to make a call to the near-end user 103 using the communication service (e.g. VoIP service) provided by that communication service provider, and the operating system 110 on the near-end user's terminal 102 is in the locked state, then the push notification service on the server 104 sends a push notification to the near-end user terminal 102 via the network (e.g. Internet) 101 notifying the operating system 110 on the near-end terminal 102 that there is an incoming communication destined for the communication client application (e.g. VoIP application) 112. In response the operating system 110 notifies the control logic (e.g. embedded application) 132 of this via the interface 118, 134 between the user terminal 102 and peripheral 108, to allow the peripheral to provide a user indication, as discussed above. Alternatively or additionally, the operating system 110 may output some notification via the speaker(s) 126 and/or screen 122 of the user terminal 102.

Such communication between the user terminal and the peripheral may use Human Interface Device (HID) protocol. Such protocol is typically used for control of audio commands between a user terminal and a peripheral, such as play or pause or volume controls. Here however, HID messages can be mapped to received notifications from said communication client application to provide user indications such as light outputs for example.

If the user 103 then actuates the actuator 136 on the peripheral 108 (e.g. presses the touch sensor or push button on the base of the docking station) then the control logic 132 on the peripheral sends a signal back to the operating system 110 via the interface 134 between the peripheral 108 and the user terminal 102. The operating system 110 then allows the call to be answered and conducted using either the speaker 126 on the user terminal 102 or the speaker 138 on the peripheral 108, and either the microphone 128 on the user terminal 102 or the microphone 140 on the peripheral 108, but in embodiments while still keeping the screen 122 of the user terminal 102 locked.

Note: while FIG. 5 illustrates the case of a locked screen 122 when the peripheral 108 is a docking station, the above mechanism can apply to other forms of peripheral as well, e.g. those of FIG. 7, 9 or 10 or others (e.g. an earpiece).

It will be understood that the present invention has been described above purely by way of example, and modification of detail can be made within the scope of the invention. Each feature disclosed in the description and (where appropriate) the claims and drawings may be provided independently or in any appropriate combination.

The various illustrative logical blocks, functional blocks, modules, and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the function or functions described herein, optionally in combination with instructions stored in a memory or storage medium. A processor may also be implemented as a one or a combination of computing devices, e.g., a combination of a DSP and a microprocessor, or a plurality of microprocessors for example. Conversely, separately described functional blocks or modules may be integrated into a single processor. The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, and a CD-ROM.

The invention claimed is:

1. A user terminal comprising:
   a peripheral interface configured to connect the user terminal to a peripheral device;
   a user interface configured to output a notification according to a notification function of the user terminal;
   a processor; and
   a computer-readable medium in communication with the processor, the computer-readable medium comprising executable instructions that, when executed by the processor, cause the processor to control the user terminal to perform:
      receiving first data associated with a first communication event while the user terminal is in a sleep or locked state, the first communication event associated with a native communication service of the user terminal;
      in response to receiving the first data, outputting, via the user interface of the user terminal, a first notification indicating an occurrence of the first communication event;
      receiving second data associated with a second communication event while the user terminal is in the sleep or locked state, the second communication event associated with a communication application that does not have access to the notification function of the user terminal while the user terminal is in the sleep or locked state; and in response to receiving the second data, sending, to the peripheral device via the peripheral interface, a signal that causes the peripheral device to generate a second notification indicating an occurrence of the second communication event.

2. The user terminal of claim 1, wherein the instructions, when executed by the processor, further cause the processor to control the user terminal to perform:

initiating the native communication service for a communication via a first communication network, the native communication service being native to an operating system (OS) of the user terminal and configured to conduct a native communication event, wherein the first communication event is the native communication event; and initiating a non-native communication service for a communication via a second communication network, the non-native communication service not being native to the OS of the user terminal and configured to conduct a non-native communication event, wherein the second communication event is the non-native communication event, wherein the notification function is configured to generate a notification when the native or non-native communication service detects an occurrence of the native or non-native communication event, and the notification function is not available to the non-native communication service when the user terminal is in the sleep or locked state.

3. The user terminal of claim 1, wherein the second data comprises a message indicating the occurrence of the second communication event.

4. The user terminal of claim 3, wherein the message comprises a push notification sent from a communication server, the push notification indicating the occurrence of the second communication event.

5. The user terminal of claim 1, wherein the instructions, when executed by the processor, further cause the processor to control the user terminal to perform:

receiving, from the peripheral device via the peripheral interface, an indication of a user input to the peripheral device, the user input indicating a user response to the second notification; and upon receiving the indication from the peripheral device, allowing the peripheral device to conduct the second communication event.

6. The user terminal of claim 1, wherein the second communication event comprises an incoming call, an active call, a live meeting, a missed call, a voicemail, a mute state, or an app launch.

7. The user terminal of claim 1, wherein the first data is received via a cellular or mobile network.

8. The user terminal of claim 1, wherein the second data is received via a packet-based network.

9. The user terminal of claim 1, wherein the peripheral interface comprises a USB port, Lightening port, Wi-Fi interface or Bluetooth interface.

10. The user terminal of claim 1, wherein the peripheral interface is configured to operate according to Human Interface Device (HID) protocol.

11. A method of operating a user terminal to generate a notification when a communication event occurs, comprising:

receiving first data associated with a first communication event while the user terminal is in a sleep or locked state, the first communication event associated with a native communication service of the user terminal;

in response to receiving the first data, outputting, via a user interface of the user terminal, a first notification indicating an occurrence of the first communication event, the user interface configured to output a notification according to a notification function of the user terminal;

receiving second data associated with a second communication event while the user terminal is in the sleep or locked state, the second communication event associated with a communication application that does not have access to the notification function of the user terminal while the user terminal is in the sleep or locked state; and in response to receiving the second data, sending, to a peripheral device, a signal that causes the peripheral device to generate a second notification indicating an occurrence of the second communication event.

12. The method of claim 11, further comprising:

initiating the native communication service for a communication via a first communication network, the native communication service being native to an operating system (OS) of the user terminal and configured to conduct a native communication event, wherein the first communication event is the native communication event; and initiating a non-native communication service for a communication via a second communication network, the non-native communication service not being native to the OS of the user terminal and configured to conduct a non-native communication event, wherein the second communication event is the non-native communication event, wherein the notification function is configured to generate a notification when the native or non-native communication service detects an occurrence of the native or non-native communication event, and the notification function is not available to the non-native communication service when the user terminal is in the sleep or locked state.

13. The method of claim 11, wherein the second data comprises a message indicating the occurrence of the second communication event.

14. The method of claim 13, wherein the message comprises a push notification sent from a communication server, the push notification indicating the occurrence of the second communication event.

15. The method of claim 11, further comprising:

receiving, from the peripheral device, an indication of a user input to the peripheral device, the user input indicating a user response to the second notification; and upon receiving the indication from the peripheral device, allowing the peripheral device to conduct the second communication event.

16. The method of claim 11, wherein the second communication event comprises an incoming call, an active call, a live meeting, a missed call, a voicemail, a mute state, or an app launch.

17. The method of claim 11, wherein the first data is received via a cellular or mobile network.

18. The method of claim 11, wherein the second data is received via a packet-based network.

19. A non-transitory computer readable medium containing instructions which, when executed by a processor, cause a user terminal to perform:

receiving first data associated with a first communication event while the user terminal is in a sleep or locked state, the first communication event associated with a native communication service of the user terminal;

in response to receiving the first data, outputting, via a user interface of the user terminal, a first notification indicating an occurrence of the first communication event, the user interface configured to output a notification according to a notification function of the user terminal;

receiving second data associated with a second communication event while the user terminal is in the sleep or locked state, the second communication event associated with a communication application that does not have access to the notification function of the user terminal while the user terminal is in the sleep or locked state; and in response to receiving the second data, sending, to a peripheral device, a signal that causes the peripheral device to generate a second notification indicating an occurrence of the second communication event.

20. The non-transitory computer readable medium of claim 19, wherein the instructions, when executed by the processor, further cause the processor to control the user terminal to perform:

initiating the native communication service for a communication via a first communication network, the native communication service being native to an operating system (OS) of the user terminal and configured to conduct a native communication event, wherein the first communication event is the native communication event; and initiating a non-native communication service for a communication via a second communication network, the non-native communication service not being native to the OS of the user terminal and configured to conduct a non-native communication event, wherein the second communication event is the non-native communication event, wherein the notification function is configured to generate a notification when the native or non-native communication service detects an occurrence of the native or non-native communication event, and the notification function is not available to the non-native communication service when the user terminal is in the sleep or locked state.

* * * * *